(12) United States Patent
Goldman et al.

(10) Patent No.: US 8,725,696 B2
(45) Date of Patent: May 13, 2014

(54) PROVIDING ACCESS TO MEDIA CONTENT IN MULTIPLE LOCATIONS

(75) Inventors: Oliver Goldman, Los Altos, CA (US); David W. George, Redwood City, CA (US); Ankit Jain, Delhi (IN); Ashutosh Sharma, New Delhi (IN); Alok Manchanda, New Delhi (IN); Ashish Baweja, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/984,320

(22) Filed: Jan. 4, 2011

(65) Prior Publication Data
US 2013/0166549 A1 Jun. 27, 2013

(51) Int. Cl.
G06F 7/00 (2006.01)
G06F 17/00 (2006.01)

(52) U.S. Cl.
USPC ........................................ 707/652; 707/736

(58) Field of Classification Search
USPC ................. 707/724, 770, 640, 736, 652, 692
See application file for complete search history.

(56) References Cited

U.S. PATENT DOCUMENTS

| 6,466,952 | B2* | 10/2002 | Hanes et al. ........................... 1/1 |
| 6,571,245 | B2* | 5/2003 | Huang et al. ........................... 1/1 |
| 6,804,689 | B1* | 10/2004 | Havrda et al. ................. 707/661 |
| 7,146,368 | B2* | 12/2006 | Sonoda et al. ........................ 1/1 |
| 7,756,836 | B2* | 7/2010 | Aboulhosn et al. ........... 707/667 |
| 2005/0267894 | A1* | 12/2005 | Carnahan ....................... 707/10 |
| 2006/0195480 | A1* | 8/2006 | Spiegelman et al. ....... 707/104.1 |
| 2009/0271873 | A1* | 10/2009 | Ram et al. ......................... 726/29 |
| 2010/0020718 | A1* | 1/2010 | Tabbara et al. ............... 370/254 |
| 2010/0169458 | A1* | 7/2010 | Biderman et al. ............ 709/219 |
| 2010/0281004 | A1* | 11/2010 | Kapoor et al. ................ 707/693 |
| 2011/0161369 | A1* | 6/2011 | Fiducci ......................... 707/783 |
| 2011/0246427 | A1* | 10/2011 | Modak et al. ................. 707/653 |
| 2012/0124042 | A1* | 5/2012 | Oshinsky et al. ............. 707/736 |

OTHER PUBLICATIONS

'IFilePromise' [online]. Adobe Systems, Inc., 2010, [retrieved on Jan. 4, 2011}. Retrieved from the internet: <URL: http://help.adobe.com/en_US/FlashPlatform/reference/actionscript/3/flash/desktop/IFilePromise.html>.

'File promises with Adobe AIR 2.0' [online]. Space of Flex/AIR technologies, 2010, [retrieved on Jan. 4, 2011]. Retrieved from the internet: <URL: http://www.riaspace.com/2010/file-promises-with-adobe-air-2-0/>.

'Uniform Resource Locator' [online]. Wikipedia, Wikimedia Foundation, Inc., 2008, [retrieved on Jan. 4, 2011). Retrieved from the internet: <URL: http://web.archive.org/web/20080415235430/http://en.wikipedia.org/wiki/Url>.

'Pasteboard file promises under 10.6' [online]. ArchiveOrange, 2010 [retrieved on Jan. 4, 2011]. Retrieved from the internet: <URL: http://web.archiveorange.com/archive/v/SEb6aMzf0UPa7e9ewJEO>.

(Continued)

Primary Examiner — Cam Truong
(74) Attorney, Agent, or Firm — Wolfe-SBMC

(57) ABSTRACT

A computer-implemented method for providing access to media content in multiple locations includes: storing media content in a system that has a memory and another storage; generating an object that represents the media content, the object including media content metadata and a media content reference configured to identify each of a memory location and a storage location; and making the object available to an application, the media content reference providing access to the stored media content at the memory location or at the storage location.

16 Claims, 2 Drawing Sheets

(56) References Cited

OTHER PUBLICATIONS

'Computer memory' [online]. Wikipedia, Wikimedia Foundation, Inc., 2010 [retrieved on Jan. 4, 2011]. Retrieved from the internet: <URL: http://web.archive.org/web/20100520214809/http://en.wikipedia.org/wiki/Computer_memory>.

'Cache' [online]. Wikipedia, Wikimedia Foundation, Inc., 2008 [retrieved on Jan. 4, 2011]. Retrieved from the internet: <URL: http://web.archive.org/web/20080626072618/http:/en.wikipedia.org/wiki/Cache>.

'Disk storage' [online]. Wikipedia, Wikimedia Foundation, Inc., 2007 [retrieved on Jan. 4, 2011]. Retrieved from the internet: <URL: http://web.archive.org/web/20071203124454/http:/en.wikipedia.org/wiki/Disk_drive>.

* cited by examiner

PROVIDING ACCESS TO MEDIA CONTENT IN MULTIPLE LOCATIONS

BACKGROUND

This specification relates to accessing media content. Media content can include, for example, image content, video content, and audio content, to name a few examples. A device can be used to generate media content. For example, a digital camera, such as a digital camera included in a mobile device, can capture image content or video content. Generated media content can often be stored on the device used to generate the media content. For example, for some devices, generated media content can be stored as a file on the device. Some devices allow a user to provide a custom name for a media content file.

SUMMARY

The invention relates to providing access to media content in multiple locations.

In a first aspect, a computer-implemented method for providing access to media content in multiple locations includes: storing media content in a system that has a memory and another storage; generating an object that represents the media content, the object including media content metadata and a media content reference configured to identify each of a memory location and a storage location; and making the object available to an application, the media content reference providing access to the stored media content at the memory location or at the storage location.

In a second aspect, a computer program product is tangibly embodied in a computer readable storage device and includes instructions that when executed by a processor perform a method. The method includes: storing media content in a system that has a memory and another storage; generating an object that represents the media content, the object including media content metadata and a media content reference configured to identify each of a memory location and a storage location; and making the object available to an application, the media content reference providing access to the stored media content at the memory location or at the storage location.

In a third aspect, a system includes: a processor; memory; storage; and instructions that when executed by the processor cause the system to perform a method. The method includes: storing media content in the system; generating an object that represents the media content, the object including media content metadata and a media content reference configured to identify each of a memory location and a storage location; and making the object available to an application, the media content reference providing access to the stored media content at the memory location or at the storage location.

Implementations can include any or all of the following features. The application selects, based on the media content metadata, one of the memory location and the storage location as a target location for the media content. The application provides the object to a consuming entity that accesses the stored media content at the memory location or at the storage location using the media content reference. The media content reference includes a pointer to the memory location or a file name for the storage location. The media content metadata specifies a compression level of the media content. The media content metadata specifies synchronous or asynchronous access to the stored media content. The media content metadata is at least in part assigned by a device that generates the media content metadata and the application performs an action on the media content based on the media content metadata. The method further includes modifying the media content metadata before the application performs the action.

Particular embodiments of the subject matter described in this specification can be implemented to realize one or more of the following advantages. Access can be provided to media content while avoiding unnecessary duplication of media content. Access can be provided to media content without requiring the accessing entity to know the location of the media content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Media (e.g., image, video) content can be stored in a system that has multiple storage locations (e.g., memory and one or more hard drives). In some instances, an application that requests media content does not have information about the storage location from which the media content will be delivered. For example, an application provides access to a user interface for a camera that can capture either still images (which will be stored in memory, in this example) and video content (which will be stored in storage other than memory, in this example). That is, when the application provides access to the camera user interface, the resulting media content is provided to the application at any of multiple storage locations (e.g., the memory for an image, or the drive for a video clip).

Where media content is located can be important. For example, some devices where the available memory is relatively limited (e.g., handheld mobile devices) could malfunction if the application begins storing the media content in memory when the camera had already placed the media content in the memory. As another example, if the application ultimately needs or expects the media content to be placed in the storage, it would be redundant to repeat that storing process if the content is already in the storage.

To handle these and other situations, an object is generated that represents the stored media content—at either location— and the object is made available to the application. The application can use the object to access the stored media content, regardless of the actual storage location of the media content. That is, from the application's point of view, it receives the media content by use of the object regardless of the particular storage location.

Figure 1:
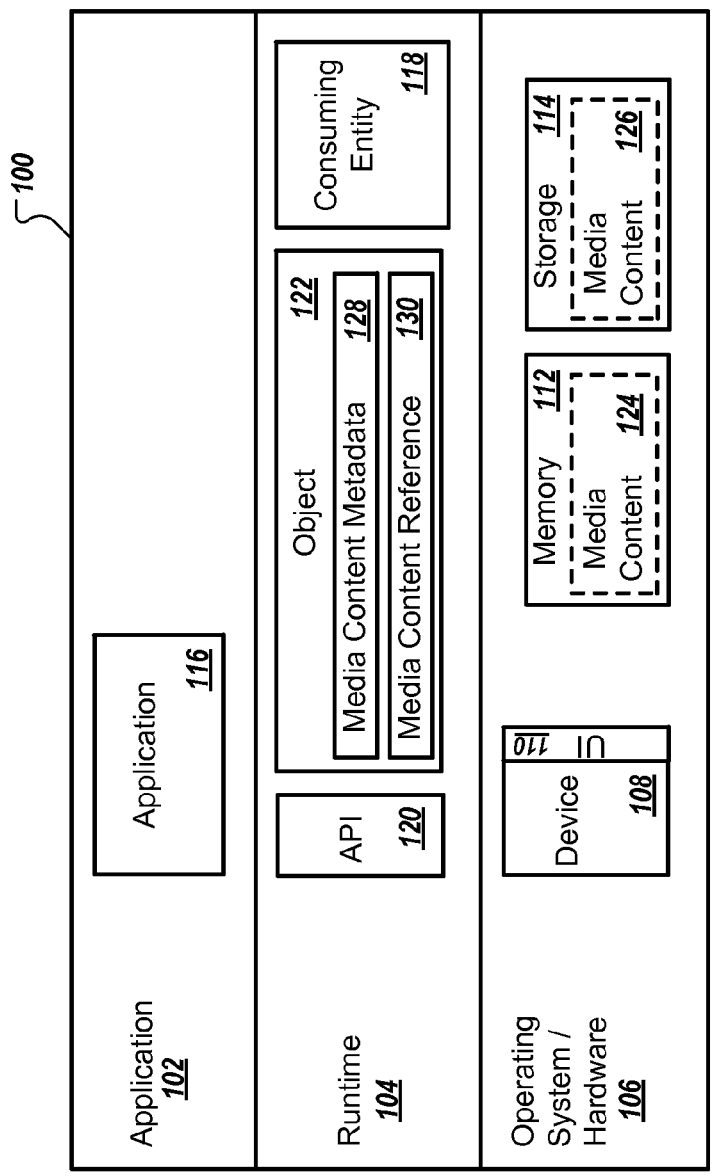
FIG. 1 is a block diagram of a device.

FIG. 1 is a block diagram of a device 100. The device 100 can be, for example, a desktop computing device, a laptop computing device, a mobile computing device (e.g., mobile phone, smart phone, personal digital assistant (PDA)) or any other type of device. The device 100 can be configured for communication with other devices over a suitable network (not shown), using any suitable communication protocol.

The architecture of the device 100 in this example includes an application layer 102, a runtime layer 104, and an operating system/hardware layer 106. The operating system/hardware layer 106 here includes a device 108 with a native user interface (UI) 110, memory 112 and storage 114. The device 108 can be, for example, a camera capable of capturing still images and video. The native user interface 110 can be displayed or otherwise presented so that a user can interact with the device. The memory 112 can include any suitable temporary-storage device, for example a memory chip. The storage 114 can include any suitable data storage device, for example a hard drive.

For example, the application layer 102 includes an application 116. The application 116 can be, for example, an application that allows a user to create and interact with camera images. The application 116 can be implemented using any suitable programming language.

The runtime layer here includes a consuming entity 118. The consuming entity 118 can be, for example, a software entity that communicates with the application program 116. For example, the consuming entity 118 can be a loader object which can load objects (e.g., image data) to a display list. The application 116 can use an API (application programming interface) 120 included in the runtime layer 104 to interact with the device 108. For example, the application 116 can use the API 120 to access a user interface which allows the capture of media content (e.g., image or video content) using the device 108. In some implementations, the consuming entity 118 can instead be some other part of the application 116.

The runtime layer 104 includes an object 122 which represents media content 124 included in the memory 112 or media content 126 included in the storage 114. The object 122 includes media content metadata 128 and a media content reference 130. The runtime layer 104 can provide the object 122 to the application 108, and the application 108 can use the object 122 to access the media content 124 or the media content 126.

Figure 2:
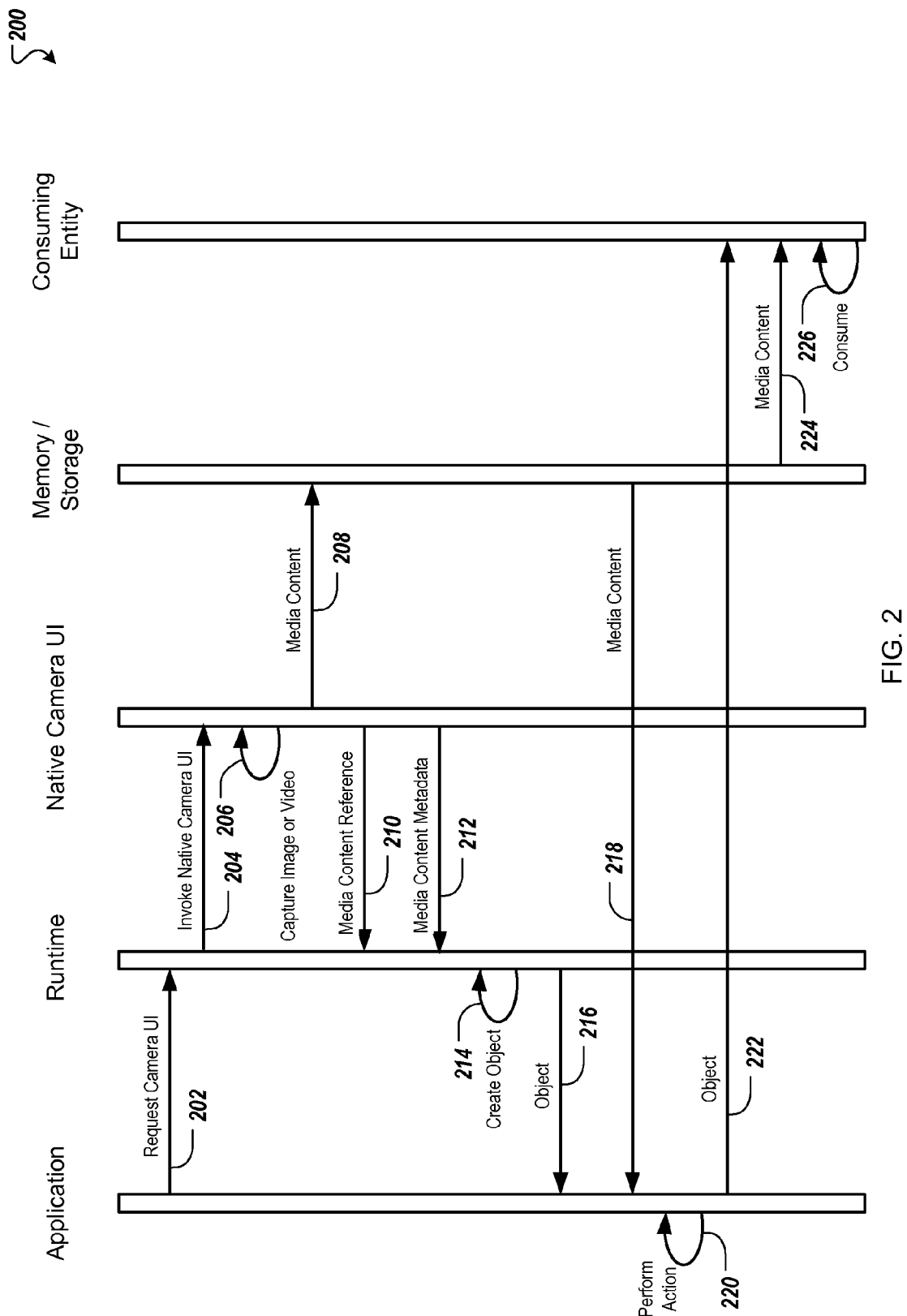
FIG. 2 is a sequence diagram illustrating a process for accessing media content.

FIG. 2 is a sequence diagram illustrating a process 200 for accessing media content. The process 200 is illustrated by the above example involving the media content from the camera that is stored either in memory or in a storage device. Accordingly, the application requests a camera user interface from a runtime (202). For example, the application 116 can request a camera user interface associated with the device 108 from the API 120 included in the runtime layer 104. The application 116 can request the camera user interface, for example, to allow the user to take a picture using the device 108.

In response to the request for the camera user interface, the runtime requests that a native camera user interface be displayed (204). For example, the API 120 can invoke an API to display the native user interface 110 associated with the device 108. The native user interface 110 can, for example, include options for capturing an image and for capturing video.

In response to a user input to capture an image or to capture video, the device captures image content or video content (206). The user input can include, for example, an indication of a media content type (e.g., image or video) to capture. As another example, a device configuration setting can determine whether image content or video content is captured. In some implementations, neither the runtime nor the application has information, at the time that the user interface is displayed, about which media content type will be generated.

The native user interface stores the captured media content in memory or in storage (208). For example, the native user interface 110 can store media content generated by the device 108 as the media content 124 in memory 112 or as the media content 126 in storage 114. In some implementations, neither the application nor the runtime has information about the storage location at the time that the user interface is displayed. The operating system can determine whether to store the media content in memory or in storage. A storage location determination can be based on media content type. For example, in some implementations, if the media content type is image content, the native user interface stores the media content in memory, and if the media content type is video, the native user interface stores the media content in storage.

As another example, the storage location determination can be based on the size of the media content. For example, if the size of the media content is below a threshold size (e.g., ten thousand bytes), the native user interface can store the media content in memory, and if the size of the media content is above the threshold size, the native user interface can store the media content in storage. As yet another example, the storage location determination can be based on a combination of media content type and media content size. For example, the native user interface can store image content that is below a threshold size in memory, can store image content that is above a threshold size in storage, and can store video content in storage regardless of the size of the video content.

In some implementations, the storage location determination can be based on available space. For example, if the amount of available memory minus the size of the media content exceeds a threshold, the media content can be stored in memory, and if the amount of available memory minus the size of the media content does not exceed a threshold, the media content can be stored in storage. Other storage location determination approaches can be used.

The native user interface sends a media content reference to the runtime (210). The media content reference can include, for example, a pointer to a memory location or a file name for a storage location. For example, the native user interface 110 can send a media content reference to the API 120, where the media content reference includes a pointer to a location in the memory 112 or a file name of a file included in the storage 114.

In addition to the media content reference, the native user interface also sends media content metadata to the runtime (212). Media content metadata can include or indicate, for example, a compression level of the media content, an access type (e.g., synchronous, asynchronous), a media content type (e.g., image, video), the size of the media content, or a name associated with the media content. A compression level can include a value that indicates, for example, a high-quality compression or a low-quality compression. A name associated with the media content can be, for example, a device-assigned name, or a user-supplied name (e.g., a name given by a user to a media content item included in a user's media gallery).

The runtime creates an object to represent the media content (214). For example, the runtime 104 can create the object 122. As shown in FIG. 1, the object 122 includes the media content metadata 128 and the media content reference 130. The media content reference and the media content metadata included in the object can be copies of, or can be based on, the media content reference and the media content metadata received from the native user interface, respectively.

The runtime provides the object to the application (216). For example, the runtime 104 can provide the object 122 to the application 116. The object can be provided, for example, either synchronously (e.g., as a return value of the request performed in step 202 above) or asynchronously (e.g., as an object included in an asynchronous message sent to the application).

The application uses the object to access the media content (218). For example, the media content reference included in the object can provide access, by a memory pointer, to the stored media content at the memory location. As another example, the media content reference can provide access, by a file name, to the stored media content at the storage location. The application does not need to be aware of whether the media content is accessed from the memory location or from the storage location. The application can use, for example, an interface provided by the object to access the media content, where the interface is simply a request to access the media content and does not specify a location of the media content. The object, rather than the application, can determine whether to access the media content from the memory location or from the storage location.

Moreover, the application can query the media content metadata included in the object. In some implementations, the application can determine the size, content type, compression level, or access type of the media content. The application can query the access type to determine, for example, whether to use an asynchronous or synchronous access method to access the media content. If an asynchronous access method is used, the application can access the media content in segments and can be notified as each segment is available to be accessed. The application can modify some media content metadata. For example, the application can modify a name (e.g., a file name or some other name) associated with the media content.

As mentioned, the application accesses the media content without knowing its storage location. However, the application can select, such as based on queried media content metadata, either the memory location or the storage location as a target location for the media content. For example, the application can select the memory location as the target location if the application intends to subsequently display the media content.

The object can provide access to the media content at the target location and can do so while avoiding unnecessary duplication of the media content. For example, if the application sets the target location to be memory and if the media content is currently located at the memory location, the media content is not copied. As another example, if the application sets the target location to be storage and if the media content is currently located at the storage location, the media content is not copied. The media content is copied only when necessary. For example, if the application sets the target location to be memory when the media content is currently located in storage, then the object can copy the media content from storage to memory.

The application performs an action on the media content (220). For example, the application can process image content or video to apply an effect or to make other modification.

The application provides the object to a consuming entity (222). For example, the application 116 can provide the object to the consuming entity 118. The consuming entity can be, for example, a loader object. The application can provide the object to the consuming entity before or after the application accesses the media content using the object. As another example, the application can provide the object to the consuming entity for the consuming entity to use to access the media content, while the application itself does not use the object to access the media content.

In a sense, the object is provided to the application or the consuming entity as an abstraction of the media content. The recipient does not need to specify (and does not even need to know) the storage location of the media content (although, in some implementations, either the application or the consuming entity can query the object to determine the storage location, if such information is desired). In some implementations, the application can provide some but not all of the information included in the object to the consuming entity. For example, the application can provide just the media content reference, or can provide the media content reference and some of the media content metadata.

The consuming entity accesses the stored media content (224). For example, the consuming entity can access the stored media content at the memory location or at the storage location using the media content reference included in the object. Similar to the application, the consuming entity does not need to be aware of whether the media content is accessed from the memory location or from the storage location.

The consuming entity initiates an action that consumes the media content (226). For example, if the consuming entity is a loader object, the media content can be added to a display list. A renderer can process the display list and can render each item in the display list, including the media content, to the screen.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for providing access to media content in multiple locations, the method comprising:
   storing media content on a computing device that has a memory and another storage;
   determining, by an operating system of the computing device, to store the media content in one of the memory or the other storage;
   generating, on the computing device, an object that represents the stored media content, the object including media content metadata that specifies a compression level of the stored media content and the object including a media content reference configured to identify each of a memory location and a storage location, the media content reference including a pointer to the memory location or a file name for the storage location, at least one of the media content metadata and the media content reference based on received media content metadata and a received media content reference received via a user interface, respectively;
   making the object available to an application, the media content reference providing access to the stored media content at the memory location or at the storage location without the application having knowledge of media storage location;
   specifying, by the application, a target location from which to obtain the stored media content, the target location being one of the memory or the other storage;
   determining whether to duplicate the stored media content from the memory to the other storage or from the other storage to the memory based on the application said specifying the target location; and
   copying the stored media content from the memory to the other storage if the media content is stored in the memory and the application specifies the target location as the other storage, otherwise not duplicating the stored media content;
   copying the stored media content from the other storage to the memory if the media content is stored in the other storage and the application specifies the target location as the memory, otherwise not duplicating the stored media content.

2. The method of claim 1, wherein the application provides the object to a consuming entity that accesses the stored media content at the memory location or at the storage location using the media content reference.

3. The method of claim 1, wherein the media content metadata specifies synchronous or asynchronous access to the stored media content.

4. The method of claim 1, wherein the media content metadata is at least in part assigned by the computing device that generates the media content metadata and the application performs an action on the stored media content based on the media content metadata.

5. The method of claim 4, further comprising modifying the media content metadata before the application performs the action.

6. The method of claim 1, further comprising:
   querying the media content metadata, by the application, to determine at least a file size of the media content, a type of the media content, and an access type of the media content.

7. The method of claim 1, wherein said determining to store the media content in one of the memory or the other storage on the computing device is based on at least one of a type of the media content and a file size of the media content.

8. Computer-readable storage memory comprising one or more applications stored as instructions that are executable and, responsive to execution of the instructions by a computing device, the computing device performs operations comprising to:
   store media content in memory components of the computing device, the memory components comprising at least a memory and another storage;
   generate, on the computing device, an object that represents the stored media content, the object including media content metadata that specifies a compression level of the stored media content and the object including a media content reference configured to identify each of a memory location and a storage location, the media content reference including a pointer to the memory location or a file name for the storage location, at least one of the media content metadata and the media content reference based on received media content metadata and a received media content reference received via a user interface, respectively;
   make the object available to an application, the media content reference providing access to the stored media content at the memory location or at the storage location without the application having knowledge of media storage location;
   specify a target location from which to obtain the stored media content, the target location being one of the memory or the other storage;
   determine whether to duplicate the stored media content from the memory to the other storage or from the other storage to the memory based on the specified target location;
   copy the stored media content from the memory to the other storage if the media content is stored in the memory and the application specifies the target location as the other storage; and
   copy the stored media content from the other storage to the memory if the media content is stored in the other storage and the application specifies the target location as the memory.

9. The computer-readable storage memory of claim 8, wherein the media content metadata specifies synchronous or asynchronous access to the stored media content.

10. The computer-readable storage memory of claim 8, wherein the computing device performs the operations further comprising to generate the media content metadata and perform an action on the media content based on the media content metadata.

11. The computer-readable storage memory of claim 10, wherein the computing device performs the operations further comprising to modify the media content metadata before the action is performed.

12. A computing device comprising:
   memory components configured to store media content, the memory components comprising at least a device memory and a storage device;
   a processor system to implement one or more device applications that are configured to:
   generate an object that represents the stored media content, the object including media content metadata that specifies a compression level of the stored media content and the object including a media content reference configured to identify each of a memory location and a storage location, the media content reference including a pointer to the memory location or a file name for the storage location providing access to the stored media content at the memory location or at the storage location, at least one of the media content metadata and the media content reference based on received media content metadata and a received media content reference received via a user interface, respectively;

make the object available to an application, the media content reference providing access to the stored media content at the memory location or at the storage location without the application having knowledge of media storage location;

specify a target location from which to obtain the stored media content, the target location being one of the memory or the other storage;

determine whether to duplicate the stored media content from the memory to the other storage or from the other storage to the memory based on the specified target location; and copy the stored media content from the memory to the other storage if the media content is stored in the memory and a device application specifies the target location as the other storage; and copy the stored media content from the other storage to the memory if the media content is stored in the other storage and the device application specifies the target location as the memory.

13. The computing device of claim 12, wherein the media content metadata specifies synchronous or asynchronous access to the stored media content.

14. The computing device of claim 12, wherein the one or more device applications are configured to:
generate the media content metadata; and
perform an action on the media content based on the media content metadata.

15. The computing device of claim 14, wherein the one or more device applications are configured to modify the media content metadata before the one or more device applications perform the action on the media content.

16. The computing device of claim 12, wherein the one or more device applications are configured to query the media content metadata to determine at least a file size of the media content, a type of the media content, and an access type of the media content.

* * * * *